(12) United States Patent
Ibarlucea et al.

(10) Patent No.: US 6,708,527 B1
(45) Date of Patent: Mar. 23, 2004

(54) GLASS FEEDER OPERATED WITH OXY-GAS COMBUSTION

(75) Inventors: Miguel Zorrozua Ibarlucea, São Paulo (BR); Nelson Seiji Yokaichiya, São Paulo (BR); Tulio Mendonca Sobrinho, São Paulo (BR)

(73) Assignees: Praxair Technology, Inc., Danbury, CT (US); Saint-Gobain Vidros S.A., Sao Paulo (BR); Instituto de Pesquisas Tecnologicas do Estado, Sao Paulos (BR)

( * ) Notice: Subject to any disclaimer, the term of this patent is extended or adjusted under 35 U.S.C. 154(b) by 365 days.

(21) Appl. No.: 09/928,460

(22) Filed: Aug. 14, 2001

(51) Int. Cl.$^7$ ................................................ C03B 5/435
(52) U.S. Cl. ................. 65/134.4; 65/135.1; 65/346; 65/347; 65/355; 432/194; 432/195
(58) Field of Search .............................. 65/134.4, 135.1, 65/346, 347, 355; 432/194, 195

(56) References Cited

U.S. PATENT DOCUMENTS

| | | | | |
|---|---|---|---|---|
| 3,515,529 A | * | 6/1970 | Love et al. .................... 65/27 |
| 3,573,895 A | * | 4/1971 | Ostberg .......................... 75/529 |
| 3,592,623 A | * | 7/1971 | Shepherd ..................... 65/134.4 |
| 4,473,388 A | | 9/1984 | Lauwers ........................ 65/134 |
| 4,604,123 A | * | 8/1986 | Desprez et al. ............. 65/135.1 |
| 5,116,399 A | | 5/1992 | Lauwers ........................ 65/135 |
| 5,158,590 A | * | 10/1992 | Jouvaud et al. ............. 65/134.4 |
| 5,417,732 A | | 5/1995 | Shamp et al. .................. 65/335 |
| 5,643,348 A | | 7/1997 | Shamp et al. ............... 65/134.4 |
| 5,795,363 A | * | 8/1998 | Pecoraro et al. ........... 65/134.4 |
| 5,814,121 A | | 9/1998 | Travis ........................... 65/346 |
| 6,047,565 A | * | 4/2000 | Moreau ......................... 65/32.1 |

\* cited by examiner

*Primary Examiner*—Sean Vincent
(74) *Attorney, Agent, or Firm*—Donald T. Black

(57) ABSTRACT

A glass feeder comprises an enclosed chamber through which molten glass can pass, and passing through each side wall into the chamber at least one burner comprising first and second burner head means for combusting oxidant and fuel within said chamber so as to generate flames which extend in axially opposite directions along each side wall, adjacent and parallel to the side walls and adjacent the surface of the molten glass.

12 Claims, 4 Drawing Sheets

GLASS FEEDER OPERATED WITH OXY-GAS COMBUSTION

FIELD OF THE INVENTION

The present invention relates to the production of glass and particularly to improvements in glass feeders.

BACKGROUND OF THE INVENTION

A glass feeder is the piece of equipment that is used in the glass industry to transport molten glass from the melting furnace, in which the glassmaking materials (soda ash, silica, scrap, and the like) are melted to form the molten glass, to the forming machines in which the desired glass articles are formed from the molten glass. The fundamental function of this equipment, besides providing a route for the molten glass between the furnace and the forming machines, is conditioning the molten glass, that is, permitting it to take on the appropriate desired viscosity, temperature and mass flow uniformity by the time it reaches the forming machines.

There are a large variety of glass feeders according to size, quantity, and furnace characteristics. The size normally depends on the pull rate (i.e. the rate of production of molten glass) and the type of glass produced. Furnaces equipped with one to five glass feeders are normally found in the industry. Their length ranges from 3 to 15 meters and the width from 0.4 to 1.5 m.

The glass enters the glass feeder in a molten state and must be kept in the molten state as it passes through the feeder. The heat is generally provided by either electric means or fuel combustion. The majority of glass feeders are heated by combustion of air and fuel gas, such as natural gas, LPG (liquefied petroleum gas) or others. In conventional practice, to provide uniform heating several small pre-mixed fuel-gas burners, firing with air at ambient temperature, are installed in the sidewalls of the glass feeder, projecting (and projecting a flame) orthogonally to the direction of glass flow.

To condition the glass, molten glass at a temperature on the order of around 1300° C. leaving the furnace enters the glass feeder, and among other things the temperature of the molten glass is reduced in as uniform a way as possible, delivering homogeneous glass to the forming machines.

To reduce the molten glass temperature, cooling air can be injected into the center of the glass feeder. This reduces the temperature where the glass flow is hotter and has the highest velocity, while fuel gas is fired in the orthogonally oriented burners in both side walls where glass velocity tends to be lower and glass tends to be cooler due to heat losses at or through the walls.

The firing and heating by combustion with air provides very low flame emissivity. The burner blocks and feeder roof are designed and built in a way that the heat delivered to these regions is in part directed back to the molten glass, near the side wall, to improve the heating where heat is required.

In addition to inefficient and non-uniform heat transfer, the conventional system has other limitations. The turn down ratio is limited, and possibilities exist of flash back when working with low gas velocities and of flame blow off when working with high velocities.

Prior art attempts to solve these problems have used premixed air-gas burners, installed along the feeder side walls, which produce very short and hot flames. The axes of these burners are orthogonal to the flow direction of the molten glass and are located in a horizontal plane just above the molten glass surface.

These flames release high heat fluxes over the glass surface near the side walls as an attempt to gather higher flame temperatures in these regions. This lowers the shear stresses in these zones of glass flow responsible for defects in the end product.

Other attempts to improve glass feeder performance have been in new burner block and roof designs, to improve heat transfer to the glass closer near the side walls.

Thus, there remains an unmet need for techniques that achieve better, more uniform temperature distribution along cross sections of a molten glass feeder, so that the glass temperatures close to the side walls of the feeder are as equal as possible compared with those in the middle of the glass flow, for all horizontal axes in the same cross section, so as to provide better temperature performance of the forming machines and better quality in the end-products.

BRIEF SUMMARY OF THE INVENTION

One aspect of the present invention is a glass feeder comprising (A) a floor, a pair of opposed side walls, a pair of opposed end walls, and a roof, which together define an enclosed chamber, inlet means in one end wall for receiving molten glass into the chamber, and outlet means in the other end wall or floor for discharging molten glass from the chamber, (B) at least one burner passing through each side wall, through a burner block, into the chamber, each burner comprising first and second burner head means for combusting oxidant and fuel within said chamber, means for feeding fuel from outside the chamber through a first set of one or more openings in each of said first and second burner head means from within said burner head means into the chamber, and means for feeding oxidant from outside the chamber through a second set of one or more openings in each of said first and second burner head means from within said burner head means into the chamber so that said fuel and oxidant mix at said burner head means after passing therethrough and do not mix before passing therethrough, wherein said first and second burner head means are oriented with respect to each other that combustion of fuel and oxidant fed therethrough produces flames at each burner head which extend in axially opposite directions and are oriented such that said flames extend parallel to the side wall through which the burner passes and adjacent to said side wall and to the glass surface.

Another aspect of the present invention is a method for operating a glass feeder, comprising flowing molten glass through a glass feeder having a floor, opposing side walls, opposing end walls and a roof which together define a chamber through which the molten glass flows, providing at least one burner passing through each side wall through a burner block into the chamber, each burner comprising first and second burner head means for combusting oxidant and fuel within said chamber, means for feeding fuel from outside the chamber through a first set of one or more openings in each of said first and second burner head means from within said burner head means into the chamber, and means for feeding oxidant from outside the chamber through a second set of one or more openings in each of said first and second burner head means from within said burner head means into the chamber so that said fuel and oxidant mix at said burner head means after passing therethrough and do not mix before passing therethrough, wherein said first and second burner head means are oriented with respect to each other that combustion of fuel and oxidant fed therethrough produces flames at each burner head which extend in axially opposite directions, and wherein each burner is oriented such that said flames extend parallel to the side wall through which the burner passes and adjacent to said side wall and to the glass surface, combusting fuel and oxidant at said burners to produce flames which extend along both side walls at the molten glass surface.

DETAILED DESCRIPTION OF THE INVENTION

Figure 1:
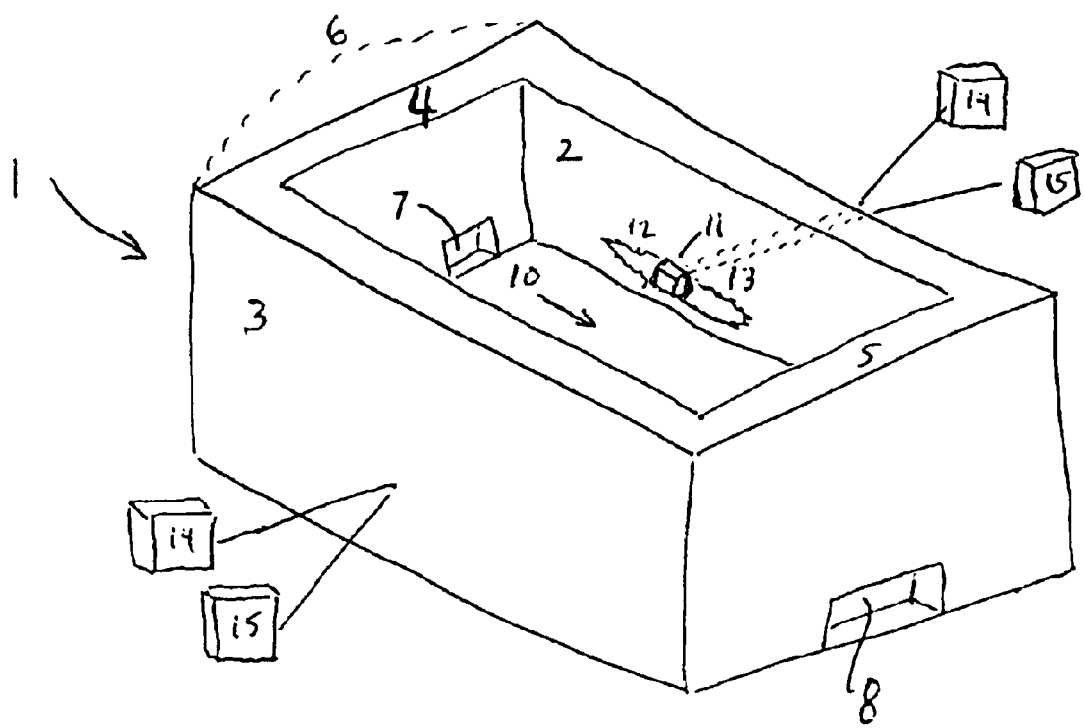
FIG. 1 depicts a glass feeder embodying the present invention.

Referring first to FIG. 1, a glass feeder incorporating the present invention is represented. The feeder 1 includes opposing side walls 2 and 3, opposing end walls 4 and 5, a floor (not shown), and a roof 6 which is shown in phantom. The walls, floor and roof together define a chamber. Molten glass 10 enters the chamber through inlet 7 in end wall 4, flows under the influence of gravity through the chamber in the direction of the arrow, and leaves the chamber via outlet 8 in end wall 5 or floor. Any means useful to provide molten glass into inlet 7, and any means useful to form products or otherwise to act on molten glass exiting outlet 8, can be used in association with feeder 1.

The floor, walls and roof are made of any material capable of retaining its physical integrity when exposed to the conditions of very high temperature and highly alkaline atmosphere which prevail within the chamber during operation. Any conventional refractory material can be used. Many examples of refractory material that would be useful for this use are known to those familiar with this field. Examples of useful refractory material include structural refractories such as fused, cast and agglomerated refractories (such as AZS, alumina, zirconia, chromite, high alumina, and the like), and insulation refractories (such as calcium silicate, silicon-alumina, alumina, and the like).

FIG. 1 also depicts burner 11, described in more detail below. Burner 11 extends through the wall 2 and includes within the chamber a pair of burner heads which produce flames 12 and 13 that extend in axially opposite directions close to side wall 2 and close to the top surface of the molten glass 10. By "axially opposite directions" is meant that the axes of the two flames are coaxial (i.e. the same axis, which is preferred) or are parallel to each other.

The flames are adjacent to the side wall and to the glass surface. Preferably the distance between the flame axis and the glass surface, in the vertical plane, is from 40 to 90 mm. In the horizontal plane, the distance between the flame axis and the adjacent wall is from 0 to 70 mm.

Burner 11 is fed fuel and oxidant from fuel source 14 and oxidant source 15 which are both outside the chamber. A corresponding burner through side wall 3 is shown as well. It can be fed from its own separate sources of fuel and oxidant, or from the same sources that feed burner 11.

Each side wall should contain at least one such burner. Depending on the size of the glass feeder chamber and the size of the burners, two or more such burners can be provided in each side wall. Preferably, they would be arranged so that flame tips from adjacent burner heads do not overlap.

Preferably, each burner and its respective burner block requires only one opening passing through the side wall, for all associated feed lines and any associated structure for holding the burner heads within the chamber. A useful way to achieve these objectives is to provide concentric conduits for feeding the fuel and oxidant, with the larger of the two conduits being also the structure that supports the burner heads within the chamber. Preferably, the outer of the two concentric conduits carries the oxidant and the inner conduit carries the fuel, to lessen the risk of the fuel degrading or polymerizing within its conduit upon exposure of the fuel conduit to the hot conditions within the chamber. The conduits should be made of material that can withstand the temperature conditions within the chamber, preferably of high-temperature alloys such as Haynes 188, Hastelloy, or Inconel. The conduits can optionally be encased in refractory material to assemble it in the burner block.

Suitable fuels include gaseous combustible hydrocarbonaceous products such as natural gas, methane, LPG (liquefied petroleum gas), propane, and mixtures thereof and the like.

Suitable oxidants include gaseous streams and mixtures comprising at least 20.9 vol. % oxygen, i.e. having at least the oxygen content of air. Preferably the oxygen content is at least 90 vol. % oxygen, and more preferably at least 99 vol. % oxygen. Commercial oxygen can be used, or oxygen-enriched air.

Figure 3:
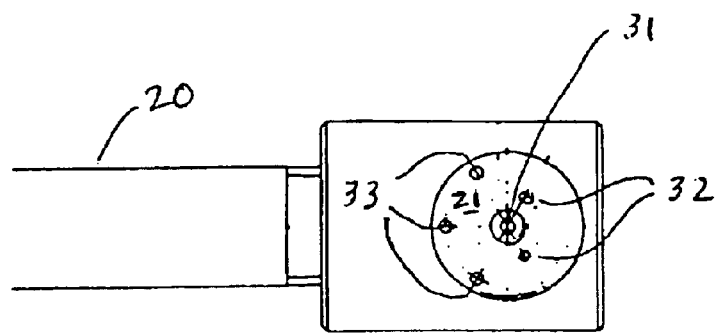
FIG. 3 is a plan view of the burner of FIG. 2, seen from one side.
Figure 2:
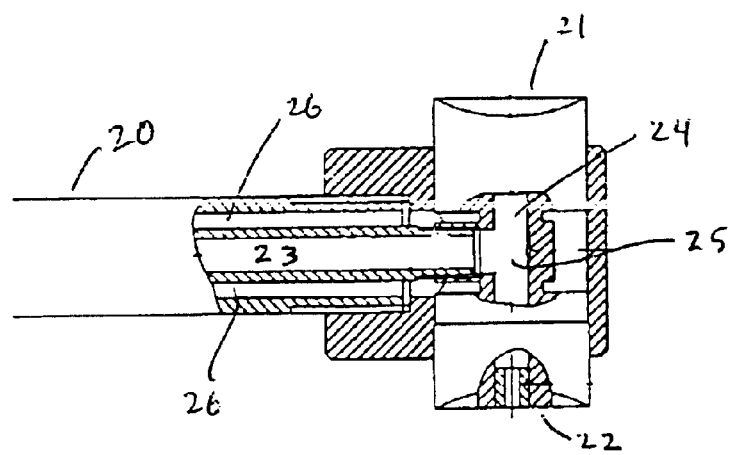
FIG. 2 is a partial cross-sectional top view of a burner incorporating the present invention.
Figure 4:
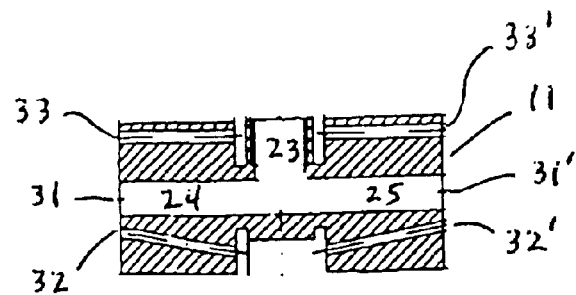
FIG. 4 is a cross-sectional top view of the burner of FIG. 2.

A preferred embodiment of the burner is depicted in FIGS. 2, 3 and 4. FIG. 2 is a top view of the burner 11 of FIG. 1, in which part of the burner 11 and parts of conduits 23 and 26 have been cut away. Burner 11 contains burner heads 21 and 22 which lie on the same axis but face away from each other. Feed conduit 20 is what passes through a suitably dimensioned opening in the burner block in which both are assembled in a side wall of the feeder. Within feed conduit 20, fuel conduit 23 is concentrically disposed within oxidant conduit 26 and they both extend through wall 2, inside the burner block, from outside the chamber. Fuel conduit 23 divides into branches 24 and 25. Branch 24 conveys fuel to burner head 21, and branch 25 conveys fuel to burner head 22. Fuel conduit 23 and branches 24 and 25 convey fuel only to one or more orifices in burner heads 21 and 22 by which fuel leaving the conduits can pass only through the orifices into the chamber of the glass feeder.

Oxidant conduit 26 conveys oxidant to the area within burner 11 outside fuel conduit 23 and branches 24 and 25. Burner 11 encloses the end of oxidant conduit 26 so that oxidant can leave burner 11 only through orifices in burner heads 21 and 22. In this way, fuel and oxidant do not mix at all within burner 11 or upstream therefrom, and do mix only outside the burner heads (and thus within the chamber) so that they can combust.

In preferred examples of furnaces embodying this invention the distance between the flame axis and the molten glass surface, in the vertical plane, is 47 mm. In the horizontal plane, the distance between the flame axis and the adjacent wall is 11 mm.

It will be recognized that other arrangements of the feed lines and burner heads are possible, so long as mixing of fuel and oxidant within the burner 11 is avoided.

FIG. 3 depicts an embodiment of the burner head 21, seen in a view looking directly at the face of burner head 21. Orifice 31, preferably situated at or near the center of burner head 21, is the end of branch 24 that carried fuel to and through burner 11. In operation, fuel emerges from orifice 31. Of course, there can be more than one orifice for fuel to pass through, so long as all such orifices are connected to the fuel conduits without permitting mixing of fuel and oxidant within the burner 11.

Burner head 21 is also provided with one or more orifices 32 and 33 which communicate with the oxidant being fed into burner 11. The one or more orifices passing fuel through the burner head, and the one or more orifices passing oxidant through the burner head, should be located with respect to each other that fuel and oxidant mix, thereby enabling combustion to occur within the chamber outside the burner head.

The embodiment shown in FIGS. 3 and 4 is a particularly preferred mode of the invention. The two sets of holes 32 and 33 are arranged respectively in two different radii from the fuel orifice 31. The orifices 32, which are on the side of the burner head that is closer to the center of the chamber, have smaller diameters than orifices 33 which are on the side that is closer to the wall. Also, as can be seen in FIG. 4, the axes of orifices 33 (and of orifices 33' in burner head 22) are parallel to the axis of the fuel orifice, whereas the axes of orifices 32 (and of orifices 32' in burner head 22) are convergent to the axis of orifice 31. This configuration compels the flames to develop over a long distance parallel to and very close to the wall surface. The flames thus produced are narrow brush-type.

The burners can be made by manufacturing separately the feed line containing conduits 23 and 26, and each burner head, and then assembling the parts into the completed burner.

Figure 5:
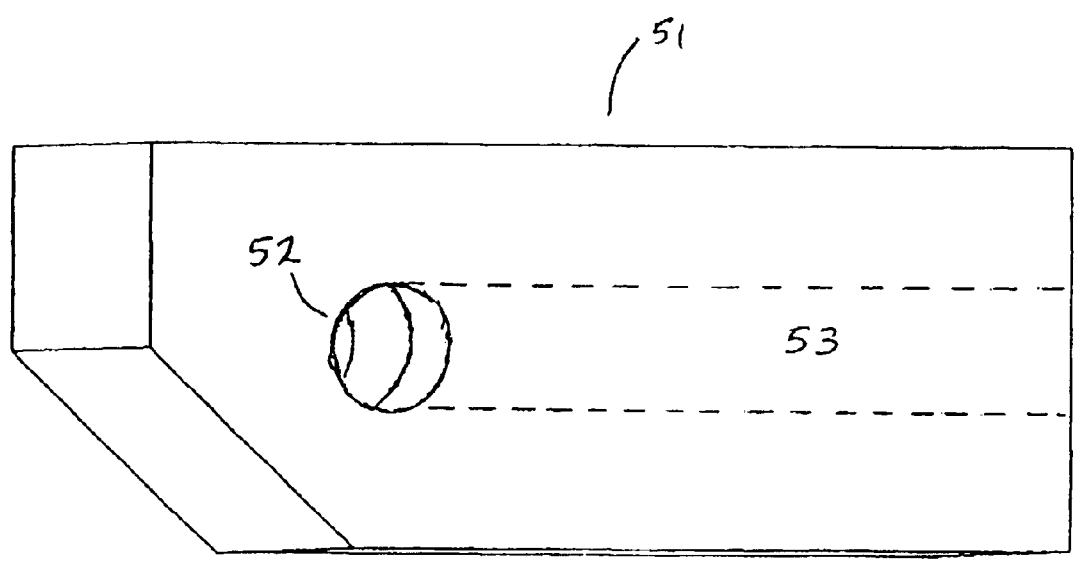
FIG. 5 is a view of a burner block useful in this invention.

The burners of the present invention are inserted through burner blocks through the side walls without deviation from the conventional vertical aspect of the side wall. Optionally the burner can be assembled into the burner block with an additional refractory material to better protect the burner parts from overheating. One example of burner block is shown as 51 in FIG. 5. The burner 11 of FIGS. 2–4 is internally assembled in this refractory material, with the conduit 20 lying in passage 53 and the faces of burner heads 21 and 22 facing out of the open ends of hole 52.

Figure 6:
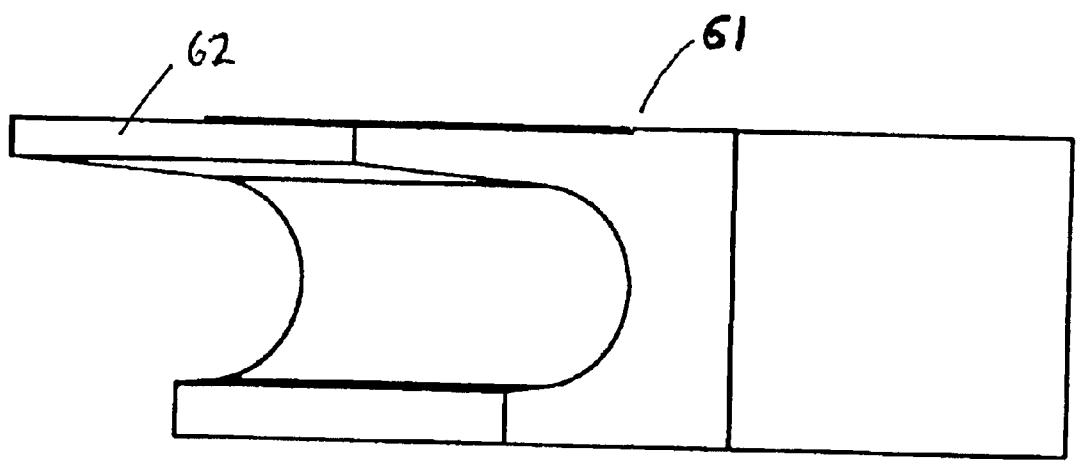
FIG. 6 is a plan view of an additional refractory block useful in this invention.

The burners of the present invention can be installed together with additional refractory blocks. One example of such additional refractory block is shown as 61 in FIG. 6. Enough blocks 61 are used side by side so that the total length of the projection 62 extend as far as the length of the flames. Projection 62 extends into the furnace the same distance from the side wall as the width of the flame. Thus, projection 62 reflects heat toward the molten glass surface that would otherwise rise from the flame away from the molten glass surface.

The present invention is also useful in retrofitting of existing glass feeders. That is, the burners and burner blocks already in place in a glass feeder are removed and replaced by the burners and burner blocks described herein. Because the flames from the burners described herein extend along the length of the side wall rather than orthogonally into the chamber, one of the burners described herein can replace several, perhaps 3 to 8, of the conventional orthogonally oriented burners.

The present invention affords numerous significant advantages. The flames produced by the oxygen-gas reaction are long, hard, much hotter and luminous. This allows higher radiant heat fluxes over the molten glass surface in very close proximity to the internal surface of the side walls. This allows higher temperatures in these regions, which improves the overall operation and glass flow of the feeder. Much better uniformity of temperature across the molten glass from side to side of the chamber is realized, which leads directly to improved flow characteristics of the molten glass. Fewer burners are needed for a glass feeder having any given capacity and rate of glass flow.

In addition, the fuel gas consumption, for the same mean cross section temperature, is generally on the order of only 60% of the original consumption, compensating for the additional cost of the oxygen.

Another advantage of this system is that less off-gases are generated that would need to be captured, recycled, or disposed of.

What is claimed is:

1. A glass feeder comprising
   (A) a floor, a pair of opposed side walls, a pair of opposed end walls, and a roof, which together define an enclosed chamber, inlet means in one end wall for receiving molten glass into the chamber, and outlet means in the other end wall floor for discharging molten glass from the chamber,
   (B) at least one burner passing through each side wall into the chamber, each burner comprising first and second burner head means for combusting oxidant and fuel within said chamber, means for feeding fuel from outside the chamber through a first set of one or more openings in each of said first and second burner head means from within said burner head means into the chamber, and means for feeding oxidant from outside the chamber through a second set of one or more openings in each of said first and second burner head means from within said burner head means into the chamber so that said fuel and oxidant mix at said burner head means after passing therethrough and do not mix before passing therethrough,
   wherein said first and second burner head means are oriented with respect to each other that combustion of fuel and oxidant fed therethrough produces flames at each burner head which extend in axially opposite directions, and wherein each burner is oriented such that said flames extend parallel to the side wall through which the burner passes and adjacent to said side wall and to the glass surface.

2. A glass feeder according to claim 1 wherein the first and second burner heads on each burner are coaxial.

3. A glass feeder according to claim 1 comprising at least two of said burners passing through each side wall.

4. A glass feeder according to claim 1 wherein said oxidant comprises at lest 90 vol. % oxygen.

5. A glass feeder according to claim 1 comprising burner head means wherein said second set of openings comprises two sets of openings, one set having a larger diameter than the other set, wherein the set that is on the side of said burner head closer to the center of the chamber have smaller diameter than the other set.

6. A glass feeder according to claim 1 wherein a projection extending into the chamber a distance equal to the width of the flame extends from the burner head means a distance along the side wall equal to the length of the flame.

7. A method for operating a glass feeder, comprising flowing molten glass through a glass feeder having a floor, opposing side walls, opposing end walls and a roof which together define a chamber through which the molten glass flows, providing at least one burner passing through each side wall into the chamber, each burner comprising first and second burner head means for combusting oxidant and fuel within said chamber, means for feeding fuel from outside the chamber through a first set of one or more openings in each of said first and second burner head means from within said burner head means into the chamber, and means for feeding oxidant from outside the chamber through a second set of one or more openings in each of said first and second burner head means from within said burner head means into the chamber so that said fuel and oxidant mix at said burner head means after passing therethrough and do not mix before passing therethrough, wherein said first and second burner head means are oriented with respect to each other that combustion of fuel and oxidant fed therethrough produces flames at each burner head which extend in axially opposite directions, and wherein each burner is oriented such that said flames extend parallel to the side wall through which the burner passes and adjacent to said side wall and to the glass surface, and combusting fuel and oxidant at said burners to produce flames which extend along both side walls at the molten glass surface.

8. A method according to claim 7 wherein the first and second burner heads on each burner are coaxial.

9. A method according to claim 7 comprising at least two of said burners passing through each side wall.

10. A method according to claim 7 wherein said oxidant comprises at lest 90 vol. % oxygen.

11. A method according to claim 7 comprising burner head means wherein said second set of openings comprises two sets of openings, one set having a larger diameter than the other set, wherein the set that is on the side of said burner head closer to the center of the chamber have smaller diameter than the other set.

12. A method according to claim 7 wherein a projection extending into the chamber a distance equal to the width of the flame extends from the burner head means a distance along the side wall equal to the length of the flame.

* * * * *